PREPARATION OF ACYLAMINO CARBOXYLIC ACIDS

Manfred Dohr, Dusseldorf-Wersten, Horst-Jürgen Krause, Dusseldorf-Holthausen, and Carl Wulff, Dusseldorf-Benrath, Germany, assignors to Henkel & Cie, G.m.b.H., Dusseldorf-Holthausen, Germany, a corporation of Germany No Drawing. Filed Aug. 9, 1957, Ser. No. 677,236

Claims priority, application Germany Aug. 28, 1956

5 Claims. (Cl. 260—404.5)

This invention relates to new and useful improvements in the preparation of acylaminocarboxylic acids.

One object of this invention is the preparation of acylaminocarboxylic acids having the formula

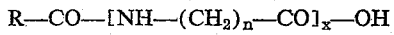

$$R-CO-[NH-(CH_2)_n-CO]_x-OH$$

in which R is an aliphatic or cycloaliphatic hydrocarbon radical containing from 8–26 and preferably 10–20 carbon atoms, $n$ is a whole number from 3–7 and $x$ is a whole number from 1–10 and is preferably not more than 5 and in which R may be connected to the carboxyl group via an aromatic radical.

These acylaminocarboxylic acids are excellently suited for use in the preparation of detergents and textile adjuvants. In the form of their water soluble salts, the same constitute highly effective detergents which are particularly well adapted for use in soft water with white materials.

The acylaminocarboxylic acids are formed in accordance with the invention by reacting a lactam which contains 5–9 atoms in its heterocyclic ring with a free carboxylic acid which contains at least 8 carbon atoms in the molecule.

Examples of suitable lactams which may be used as starting materials in accordance with the invention include, butyrolactam, valerolactam, caprolactam, octanoic acid lactam and similar lactams. These lactams may be substituted at the nitrogen atom by lower hydrocarbon radicals containing for example, 1–3 carbon atoms. Thus for example, methylcaprolactam may be used as a starting material in accordance with the invention.

The starting carboxylic acids which may be used in accordance with the invention should contain an aliphatic, such as a straight branched chain or aliphatic radical, cycloaliphatic or hydroaromatic radical having about 8–26 and preferably 10–20 carbon atoms. These radicals may be connected to the carboxyl group through an aromatic radical.

These starting carboxylic acids used in accordance with the invention may therefore be straight or branched chain fatty acids of natural or synthetic origin which may be of a saturated or unsaturated nature. Examples of these acids include, caprylic acid, pelargonic acid, capric acid, undecylic acid, lauric acid, palmitic acid, stearic acid, oleic acid, linoleic acid, behenic acid, montanic acid, and the like. They may be used in pure form or else in the form of their mixtures as commercially available. As examples of cycloaliphatic carboxylic acids, there may be mentioned resinic or naphthenic acids, such as, abietic acid. Furthermore, there may be used acids such as alkylcyclohexyl carboxylic acids and compounds which are derived by complete hydrogenation from aromatic carboxylic acids such as diphenylcarboxylic acids, triphenylcarboxylic acids, benzylbenzoic acid, benzylnaphthoic acid, as well as substitution products, particularly alkyl derivatives of the said carboxylic acids. Alkyl or cycloalkylbenzoic acids and carboxylic acids which are obtained from the said aromatic carboxylic acids by partial or complete hydrogenation are suitable. Other carboxylic acids, wherein the radicals bound to the carboxyl group are not pure hydrocarbon radicals, such as for instance, ether carboxylic acids, as for example, those derived from glycolic acid, are also suitable starting materials. Such compounds can be obtained for instance by reacting corresponding alcohols with halogen carboxylates, particularly with salts of chloroacetic acid in the presence of acid-binding agents.

The reaction is effected by contacting the carboxylic acid and lactam at a temperature between about 150–300° C. and preferably between about 200–250° C. in the substantial absence of oxygen. One of the components may be maintained in a molten state and the other may be introduced into it, or both of the components may be present in the molten state.

In order to insure the absence of oxygen, it is preferable to effect the reaction under an inert gas, such as, carbon dioxide, nitrogen or steam.

The reaction may be effected at elevated pressures in an autoclave, the increase in pressure being introduced by the inert gas. Pressures of up to 100 atmospheres and preferably from 1–25 atmospheres may for example be employed in this connection.

The initiation of the reaction may be facilitated by adding small quantities of water, as for example, 0.1–20% and preferably 0.1–0.5% of the entire reaction mixture. It is also possible to effect the reaction in the presence of inert diluents, as for example, in the presence of organic solvents which are inert to the reaction constituents and which do not take part in the reaction. Such solvents include for example, hydrocarbons and particularly those which may be separated from the reaction product by distillation temperatures up to 200° C. and preferably temperatures up to 100° C. at normal or reduced pressure.

The reaction product obtained in accordance with the invention and particularly when using higher carboxylic acids not only consists of simple acylaminocarboxylic acids but in addition compounds which contain a plurality of aminocarboxylic acid radicals connected with each other in the form of an amide, i.e., when $x$ in the general formula is more than one.

Compounds having aminocarboxylic acid radicals bound in a form of a polyamide are produced in particular when the lactam is used in greater than equimolecular quantities with respect to the carboxylic acid. Up to 10 and preferably not more than 4 mols of lactam may be used per mol of carboxylic acid. Even however, when effecting the reaction with equimolecular quantities of the fatty acid and the lactam, formation of the polyamide like products will not always be entirely suppressed. The reaction product also contains corresponding quantities of free carboxylic acid. In all cases, reaction products are produced which are a mixture of compounds which contains a larger or smaller number of aminocarboxylic acid radicals in the molecule.

For many purposes, the separation of the reaction product is not necessary and at times not even desirable. If however, it is desired to obtain pure materials, the reaction products, insofar as there are concerned products having a smaller number of aminocarboxylic acid radicals bound in the manner of polyamides, can be separated by fractional crystallization or by fractional distillation of the methyl esters.

As is mentioned, the acylaminocarboxylic acids formed in accordance with the invention in the form of their water soluble salts, as for example, alkali metal water soluble salts, constitute excellent detergents which are particularly well suited for washing white material in soft water. This is particularly true in connection with acids obtained in accordance with the invention in which $x$ is not greater than 5 and preferably not greater than 3. In addition to this use, the compounds in accordance with the invention are suitable for the preparation of textile adjuvants.

The following examples are given by way of illustration and not limitation.

*Example 1*

A mixture of 113 grams caprolactam (1 mol) and 190 grams lauric acid (0.95 mol) is heated in a stainless steel autoclave provided with an agitator for four hours at 240° C. after introducing nitrogen under a pressure of 5 atm. As a result of this, the pressure increases to 16 atm. After cooling the autoclave and reducing the pressure, a solid crystal mass is removed, which is washed with water and can be recrystallized from ethyl alcohol. The acid number of the recrystallized product is 186. By neutralizing the crude crystal mass or the product purified by recrystallization with caustic soda solution, caustic potash solution or mono-, di- or triethanolamine, there are obtained the corresponding salts which are readily soluble in water.

*Example 2*

Example 1 is repeated with the addition of 10 grams of water to the reaction mixture before the commencement of the reaction. The reaction product is obtained in the form of a crystal mass after the cooling. It is washed with water and dried. The acid number of the product obtained in this way is 193. The reaction product is formed into a suspension in water and neutralized with the calculated quantity of sodium carbonate, potassium carbonate or guanidine carbonate and the corresponding readily soluble salts are obtained.

*Example 3*

A mixture of 339 grams caprolactam (3 mols) and 200 grams lauric acid (1 mol) is heated in a stainless steel autoclave provided with an agitator for five hours at 240° C. after introducing nitrogen under a pressure of 5 atm. After cooling, the white waxlike crystal mass is washed with water and dried. The reaction product obtained in this way has an acid number of 110. It can be converted into the water-soluble salts in the manner described in the preceding examples.

*Example 4*

A mixture of 339 grams caprolactam (3 mols) and 200 grams (1 mol) lauric acid is heated in a 3-neck flask with agitation in a stream of nitrogen for 12 hours at 250° C. After the cooling of the reaction mixture, there is obtained a crystal mass which is washed with water and dried. It has an acid number of 123.

*Example 5*

339 grams (3 mols) caprolactam, 200 grams (1 mol) lauric acid and 100 grams water are heated in a stainless steel autoclave provided with agitator for five hours at 240° C. after introducing nitrogen under a pressure of 5 atm. In this treatment, there is developed a maximum pressure of 28 atm. After cooling, the waxlike crystal mass is washed with water and dried. The reaction product obtained in this manner has an acid number of 121. It can be converted into the water-soluble salts in the manner described in the preceding examples.

*Example 6*

A mixture of 113 grams (1 mol) caprolactam and 270 grams (0.95 mol) stearic acid is heated in a stainless steel autoclave provided with agitator for five hours at 250° C. and an initial pressure of 5 atm. nitrogen. The white waxlike crystal mass obtained upon cooling is washed in water and dried. It then has an acid number of 139. This crude product can be recrystallized from ethyl alcohol. Specimens of the reaction product obtained in this way are formed into a suspension in water in the manner described in Examples 1 and 2 and neutralized with the alkalis mentioned in those examples. There are obtained aqueous pastes of the corresponding salts.

*Example 7*

A mixture of 226 grams (2 mols) caprolactam and 138 grams (0.5 mol) hydrostearine (stearic acid obtained by the hydrogenation of technical oleic acid) is heated for five hours at 240° C. in an autoclave provided with agitator at an initial pressure of 5 atm. nitrogen. During this treatment a pressure of 13 atm. is reached. After cooling, the waxlike mass is washed with water and dried. The reaction product can be recrystallized from butanol. It has an acid number of 90. By neutralizing small samples of the reaction product in the presence of water with the alkalis described in the preceding examples, the corresponding water-soluble salts of organic or inorganic bases are produced.

*Example 8*

A mixture of 56.5 grams caprolactam (0.5 mol) and 284 grams stearic acid (1 mol) is heated in an autoclave provided with agitator for four hours at 240° C. after introducing nitrogen under a pressure of 5 atm. During this treatment there is developed a maximum pressure of 8.3 atmospheres. After cooling, the excess pressure is removed from the autoclave and the waxlike mass obtained is washed with water and recrystallized from methyl alcohol. The reaction product purified in this manner has an acid number of 176.

*Example 9*

Example 8 is repeated but using as starting material a mixture of 79.2 grams caprolactam (0.7 mol) and 284 grams stearic acid (1 mol). The time of heating is five hours and the pressure which develops in this connection 16 atmospheres. After working up as in Example 8, there is obtained an acid mixture having an acid number of 162.

*Example 10*

A mixture of 311 grams fatty acids of rape seed oil (main component behenic acid, $C_{22}$) (1 mol), 102 grams caprolactam (0.9 mol) and 10 grams water is heated in a stainless steel autoclave provided with an agitator for five hours at 240° C. after introducing nitrogen under a pressure of 20 atmospheres. During this treatment, there is developed a maximum pressure of 38 atmospheres. After cooling, the excess pressure is removed from the autoclave. The reaction product is then melted under a stream of nitrogen, water is added under agitation and after solidifying the reaction product by cooling, the water is removed by filtering and the filter cake is dried. The reaction product purified in this manner has an acid number of 140.

*Example 11*

A mixture of 256 grams palmitinic (1 mol) acid and 113 grams caprolactam (1 mol) is treated as described in Example 2. The reaction product has an acid number of 160.

The following tables gives the average values for $x$ (number of amino capronic acid radicals per molecule) in the products of the foregoing examples.

| Example No.: | Average number of $x$ |
|---|---|
| 1 | 1.0 |
| 2 | 0.9 |
| 3 | 2.7 |
| 4 | 2.3 |
| 5 | 2.3 |
| 6 | 1.1 |
| 7 | 3.1 |
| 8 | 0.31 |
| 9 | 0.59 |
| 10 | 0.80 |
| 11 | 0.84 |

The acylaminocarboxylic acids containing two and more aminocarboxylic acid radicals in their molecule are new chemical compounds. They are present even in the products of the Examples 1, 2 and 8–11, as could be shown by qualitative paper chromatography.

It is not necessary to effect the reaction in complete absence of oxygen, i.e., that the reactants have to be completely purged from any dissolved atmospheric oxygen. It is sufficient to avoid a contact between the reactants and oxygen by effecting the reaction under a protecting atmosphere.

We claim:

1. An acylaminocarboxylic acid having the formula $$R-CO-[NH-(CH_2)_5-CO]_x-OH$$

in which R is an aliphatic hydrocarbon radical having about 8–26 carbon atoms and $x$ is a whole number of from 2–5.

2. A water soluble salt of an acylaminocarboxylic acid having the general formula $$R-CO-[NH-(CH_2)_5-CO]_x-OH$$

in which R is an aliphatic hydrocarbon radical having about 8–26 carbon atoms and $x$ is a whole number of from 2–5.

3. Salt according to claim 2 in which R represents an aliphatic hydrocarbon radical containing about 11–17 carbon atoms.

4. A mixture of acylaminocarboxylic acid consisting of a minor amount by weight of compounds having the formula $$R-CO-[NH-(CH_2)_5-CO]_x-OH$$

and a major amount by weight of compounds having the formula $$R-CO-NH(CH_2)_5-COOH$$

in which R is an aliphatic hydrocarbon radical with about 8–26 carbon atoms, and $x$ is a whole number from 2–5.

5. A mixture according to claim 4, wherein the minor amount constitutes 1–20 percent by weight of the total acylaminocarboxylic acids.

References Cited in the file of this patent

UNITED STATES PATENTS

| | | |
|---|---|---|
| 2,041,265 | Orthner | May 19, 1936 |
| 2,071,253 | Carothers | Feb. 16, 1937 |
| 2,562,797 | Oosterbeek | July 31, 1951 |
| 2,689,170 | King | Sept. 14, 1954 |
| 2,731,480 | Kruckenberg | Jan. 17, 1956 |

FOREIGN PATENTS

| | | |
|---|---|---|
| 535,421 | Great Britain | Apr. 1, 1941 |
| 1,094,480 | France | May 23, 1955 |

UNITED STATES PATENT OFFICE
CERTIFICATION OF CORRECTION

Patent No. 2,956,068                          October 11, 1960

Manfred Dohr et al.

It is hereby certified that error appears in the above numbered patent requiring correction and that the said Letters Patent should read as corrected below.

Column 1, line 49, strike out "or" and insert the same after "straight" in same line 49; column 2, line 57, for "contains" read -- contain --; line 62, before "insofar" insert -- at least --; column 6, line 1, for "acid" read -- acids --; same column 6, line 27, list of references cited, under "FOREIGN PATENTS", for "1,094,480" read -- 1,094,676 --.

Signed and sealed this 1st day of August 1961.

(SEAL)
Attest:

ERNEST W. SWIDER
Attesting Officer

DAVID L. LADD
Commissioner of Patents